US010794333B2

(12) United States Patent
Weaver et al.

(10) Patent No.: US 10,794,333 B2
(45) Date of Patent: Oct. 6, 2020

(54) GENERAL AVIATION CARBURETOR TESTING AND ANALYSIS DEVICE

(71) Applicant: Weaver Intellectual Property, LLC, Spring, TX (US)

(72) Inventors: Ronald J. Weaver, Jupiter, FL (US); Dale Ballenger, Jupiter, FL (US); Chad Szwarnowicz, Jupiter, FL (US)

(73) Assignee: Weaver Intellectual Property, LLC, Spring, TX (US)

( * ) Notice: Subject to any disclaimer, the term of this patent is extended or adjusted under 35 U.S.C. 154(b) by 219 days.

(21) Appl. No.: 16/058,689

(22) Filed: Aug. 8, 2018

(65) Prior Publication Data

US 2019/0048828 A1 Feb. 14, 2019

Related U.S. Application Data

(60) Provisional application No. 62/543,147, filed on Aug. 9, 2017.

(51) Int. Cl.
| | |
|---|---|
| *F02M 19/01* | (2006.01) |
| *F02M 69/20* | (2006.01) |
| *B64F 5/60* | (2017.01) |
| *F02M 65/00* | (2006.01) |

(52) U.S. Cl.
CPC ............... *F02M 19/01* (2013.01); *B64F 5/60* (2017.01); *F02M 65/00* (2013.01); *F02M 69/20* (2013.01)

(58) Field of Classification Search
CPC ........ F02M 19/01; F02M 69/20; F02M 65/00; B64F 5/60
See application file for complete search history.

(56) References Cited

U.S. PATENT DOCUMENTS

| | | | |
|---|---|---|---|
| 2,351,027 | A | 6/1944 | Ewart et al. |
| 2,697,940 | A | 12/1954 | Crosby et al. |
| 3,456,500 | A | 7/1969 | Zaske |
| 3,469,442 | A | 9/1969 | Brueckner |
| 3,524,344 | A | 8/1970 | Converse et al. |
| 3,741,006 | A | 6/1973 | Bordeaux |
| 4,030,351 | A | 6/1977 | Smith |
| 4,030,352 | A | 6/1977 | Smith et al. |
| 4,269,062 | A | 5/1981 | Smitley |
| 4,343,348 | A | 8/1982 | Scourtes |

(Continued)

FOREIGN PATENT DOCUMENTS

| | | |
|---|---|---|
| DE | 2257289 | 5/1973 |
| FR | 2817342 | 5/2002 |

*Primary Examiner* — Freddie Kirkland, III (74) *Attorney, Agent, or Firm* — McHale & Slavin, P.A.

(57) ABSTRACT

A testing device for general aviation carburetors and fuel servos. The testing device is capable of replicating carburetor operating characteristics and using sensors to monitor and record the operating characteristics of both horizontal and vertical type carburetors, and compare the data received with predefined values. The testing device measures both test fluid and air flow through a carburetor. A moveable camera is placed within the throttle body of the carburetor being tested providing visual inspection of the fluid atomization with snap shot capability. The testing device also includes flow sensors to record the performance of the carburetor, providing automated data collection with memory storage. The device is fully portable with lockable caster wheels.

14 Claims, 7 Drawing Sheets

(56) References Cited

U.S. PATENT DOCUMENTS

| | | | |
|---|---|---|---|
| 5,417,109 A | 5/1995 | Scourtes | |
| 5,633,457 A | 5/1997 | Kilar et al. | |
| 6,701,784 B1 * | 3/2004 | Matusek | F02M 19/01 73/313 |
| 6,944,494 B2 * | 9/2005 | Forrester | A61B 1/042 600/478 |
| 7,143,641 B2 * | 12/2006 | Palazzolo | F02M 65/001 73/114.48 |
| 8,131,406 B2 | 3/2012 | Morris et al. | |

* cited by examiner

GENERAL AVIATION CARBURETOR TESTING AND ANALYSIS DEVICE

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 62/543,147, entitled "GENERAL AVIATION CARBURETOR TESTING AND ANALYSIS DEVICE", filed Aug. 9, 2017. The contents of which the above referenced application is incorporated herein by reference.

FIELD OF THE INVENTION

This invention is directed to the field of portable test benches, and in particular to a self-contained test bench for analyzing carburetors and fuel servos used in general aviation aircraft.

BACKGROUND OF THE INVENTION

Internal combustion engines employ a fuel servo or carburetor for preparation of an air-fuel mixture required for the combustion process. A fuel servo meters pressurized fuel which is directed to fuel injectors. A carburetor prepares an air-fuel mixture. For simplicity of discussion, this disclosure will be directed to carburetor testing and analysis but it is noted that the instant device works equally as well with fuel servos.

In General Aviation ("GA") airplanes, a carburetor also includes a provision to adjust the air-fuel mixture for various conditions including change in density altitude. Optimum performance of a GA engine with a constant speed propeller may be determined by monitoring the Exhaust Gas Temperature (EGT). For instance, the slower burning characteristics of a lean mixture will cause the heat of combustion to continue further into the power stroke and EGT peaks lean of stoichiometric. Enriching the mixture, e.g. minus 125 degrees Fahrenheit rich of peak EGT, will produce the best power. When an air-cooled aircraft engine is running at normal power, if fuel is slowly added to the stoichiometric mixture it will have a cooling effect and the combustion gas and cylinder head temperature will decrease. On non-constant speed propellers, RPM may be used as an indication of power.

A GA carburetor must operate within design specifications to meet the needs of the engine and for the safety of the airplane occupants. For these reasons carburetors are tested to when they are new, at a time of rebuilding, or during preventative maintenance reviews. In operation, a float carburetor employs a chamber that is filled with fuel using the float to regulate the amount of stored fuel. Fuel from the float chamber is drawn into the carburetor by a venturi using a metered jet. In the throat of the carburetor, air pressure is dropped in accordance with Bernoulli's principle wherein fuel is introduced into the induction air before the entry into the cylinders for the combustion process. A main fuel jet outlet is used so that the fuel can atomize and diffuse to the maximum extent possible. An air bleed can be used so that air bubbles are introduced to improve vaporization of the fuel.

When the throttle is nearly closed on a carburetor, the airstream flow decreases to an extent that the fuel flow through the main jet becomes unresponsive. At this closed throttle position there remains an air gap where the throttle valve almost touches the wall of the carburetor throat wherein an idling jet is used to provide a proper fuel/air mixture. Manual mixture control of GA carburetors is needed because at higher altitudes the volume of air is the same but its density is less. Therefore, the amount of fuel must be reduced to prevent the mixture from becoming too rich. The above illustrates that a GA carburetor may be simple in concept, but each carburetor may have unique characteristics that can enhance performance when operating correctly or detract from the performance if out of calibration for its respective engine.

As with any mechanical device, a carburetor must be checked for proper operation both at the time of manufacture and during any engine rebuild operation. In addition, a carburetor may malfunction in between the date of manufacture and date of engine rebuild. A carburetor used infrequently may have spoiled fuel which can gum up the jets and float bowl. A carburetor used in an adverse environment may suffer from premature gasket failure.

Due to the inherent problems that can occur with an aircraft carburetor that is not operating properly, it is imperative that any carburetor placed into service is tested. While carburetor test benches are known in the industry, what is needed in the industry is a diagnostic test bench that is self-contained, portable, and capable of resembling engine operational characteristics with the ability to view actual operation and document all carburetor operational characteristics.

SUMMARY OF THE INVENTION

Disclosed is a testing device for general aviation carburetors. The device includes a vacuum pump that is capable of duplicating the airstream flows through a carburetor with meters measuring the air-test fluid operational characteristics of the carburetor. Test fluid is introduced into the airstream flow by the carburetor jets. A quick release clamp allows attachment of either vertical or horizontal type carburetors including those from AVStar Fuel Systems; Marvel Schebler, Precision Airmotive and the like. A pump delivers test fluid to the carburetor under test conditions wherein the operational characteristics are viewed and analyzed. The testing device includes sensors to record the performance of the carburetor providing automated data collection with memory storage. A throttle body placed camera is positioned within the carburetor throat to provide visual inspection of the atomization with snap shot capability.

After the air-fluid mixture is passed through the carburetor, test fluid is separated from air stream by a two-stage separator. The device is fully portable with lockable caster wheels.

An objective of the invention is to disclose an improved test bench constructed specifically for general aviation carburetors.

Another objective of the invention is to disclose a general aviation carburetor diagnostic test bench having a liquid separator that uses drip edges for optimum separation of test fluid from air.

Still another objective of the invention is to disclose a general aviation carburetor diagnostic test bench having vacuum capable of replicating an internal combustion engine air draw to effectuate the venturi operation of a carburetor from idle air flows up to rated air flows.

Yet still another objective of the invention is to disclose a general aviation carburetor diagnostic test bench having a camera probing a carburetor throttle body to provide visual inspection of the carburetor operation, the camera capable of taking video or still shots for performance recording.

Another objective of the invention is to disclose a general aviation carburetor diagnostic and testing bench having quick release clamps for securing either a horizontal or a vertical type carburetor to the bench.

Still another objective of the invention is to provide an improved test bench for general aviation carburetors that is compact in size allowing true portability by inclusion of caster wheels for ease of movement.

Other objectives and further advantages and benefits associated with this invention will be apparent to those skilled in the art from the description, examples, and claims which follow.

DETAILED DESCRIPTION OF THE PREFERRED EMBODIMENT

A detailed embodiment of the instant invention is disclosed herein. Specific functional and structural details disclosed herein are not to be interpreted as limiting, but merely as a basis for the claims and as a representation basis for teaching one skilled in the art to variously employ the present invention in virtually any appropriately detailed structure.

Referring now to the drawings, the general aviation carburetor testing and analysis device 10 of the instant invention consists of a frame assembly encompassed by a back panel 12, a top panel 14, a bottom panel 16, a left side panel 18, a right-side panel 20, and a frontal section 22. The frontal section 22 includes a bench top weldment 24 housing an intake plenum 26 with a camera scope 28 extending through the intake plenum 26. The frame assembly consists of vertical 120 and horizontal 122 supports constructed and arranged to support the above-mentioned panels and internal components. The frame assembly is lightweight and compact, allowing portability by use of castor wheels.

The frontal section 22 is further defined with an air pressure gauge 30 and a test fluid pressure gauge 32. A video monitor 34 displays images from the camera scope 28. A monitor 46 is coupled to a computer system that has stored predetermined values for use in comparing the carburetor being tested versus a base line which characterizes the proper operation of a new carburetor. Software includes the ability to monitor all key aspects of any test regarding air and test fluid flow, and record all test conditions and results for tracking by serial or other reference number. A horizontal air port 36 is available for use with horizontal style carburetors using a port plug 38' for sealing the vertical extension port 44 when not in use. A vertical air port 40 includes a pipe member 42 having a 90-degree bend for positioning a 4" vertical port extension 44 directly above intake plenum 26. For illustration purposes, a carburetor 200 is secured to the intake plenum 26 with an upper portion of the carburetor 200 secured to the vertical port extension 44. Horizontal port 36 includes plug 38 to prevent airflow through the bottom circuit.

A regenerative vacuum pump 50 introduces an airstream through the intake plenum 26 pulling air through the carburetor 200 for testing. The impeller based vacuum 50 is oil free and provides a continuous airstream using anti-sparking cast aluminum housing. External power is supplied to the vacuum pump 50, test fluid pump 100 and diagnostic equipment by attachment through electrical plug 52. The vacuum pump 50 permits testing to replicate a high rpm power operation such as that produced by an aircraft engine operating up to 2,700 rpm, or a low speed load such as that produced by an aircraft engine operating at idle between 600-700 rpm. An airstream is created by pulling air through the carburetor 200 with the discharged airstream directed through a transfer pipe 42 before entering an intake 54 to the primary liquid separator 56. Test fluid collected in the primary separator 56 is directed through a fluid collection tube leading to a test fluid storage tank 60. A coupling 62 connects the outlet of the primary liquid separator 56 to the intake of a secondary liquid separator 66, the secondary separator 66 polishing the airstream by also draining any remaining test fluid from the airstream directed to the test fluid storage tank 60 by fluid collection tube 68. Both collection tubes make use of a check valve 64 which is normally open and closed under vacuum. The secondary separator 66 having a coupling 70 routed to the vacuum 50 by transfer pipes 94 essentially providing a closed loop circulation.

The horizontal air port 36 and the vertical air port are adjoined by wye 72. The ports 36, 40 exhaust the carburetor depending on whether the carburetor being tested is a horizontal or vertical type. When testing vertical type plug 38 is utilized preventing airflow.

The primary separator 56 includes a screen element 80 positioned within a housing 74 which is coupled to a base 76 with quick release couplers 78. A drip screen 82 is provided from a baffle having a drip edge 84 located along a lower portion of the drip screen. The drip edge 84 is constructed and arranged to create a laminar flow surface which causes the reduction and/or removal of atomized test fluid from the airstream. The airstream impacting the drip screen 82 causes test fluid to be separated from the airstream, the buildup of test fluid on the surface of the drip screen helps attract additional fluid for enhanced recovery. Similarly, the secondary separator 66 includes a filter element 88 positioned within a housing 86 and coupled to a base with quick release couplers 90. A drip screen 92 may also be added but is not needed in the preferred embodiment as the secondary filter operates as a polishing filter.

The test fluid storage tank 60 provides a continuous flow of fluid through an inline valve 96, followed by a filter 98, coupled to a fluid pump 100 which is fluidly coupled to the carburetor 200 by a control valve 102 located on the front panel. The control valve routes the test fluid through the appropriate circuit depending on what type of fuel system or fluid pressure is required. For GA carburetors, fuel pressure is typically less than 8 psi. For GA fuel servos, fuel pressure requirements can vary but typically require at least 12 psi at idle and require proper operation at much higher pressures. The control valve directs the flow of the test fluid through either an internal pressure regulator providing a pre-set test fluid pressure or through an adjustable pressure regulator 124 on the front of the bench. Furthermore, in the adjustable pressure circuit, an electric boost pump 128 can increase the pressure of the test fluid to a level similar to that seen on a GA aircraft. Said boost pump can be triggered by engaging the pump using switch 126. An ultrasonic level indicator 104 is used to monitor the amount of test fluid in the storage tank 60. A flow transmitter 106 and mass flow meter 108 are used to record the test fluid flow rate. The carburetor 200 receives test fluid flow for filling a carburetor float chamber for delivery through the carburetor jets. The pump 100 provides a realistic repeat of a fuel system found on a general aviation aircraft by employing a general aviation pump. Operation of the carburetor flow jets can be visually inspected using the monitor 34. The monitor 34 displays images captured by the camera scope 28 positioned within the throttle body of the carburetor being tested.

Used or new carburetors designed for general aviation aircraft from manufacturers such as AVStar Fuel Systems; Marvel Schebler, Precision Airmotive and the like can be viewed internally as well as tested. For instance, in determining the flow pattern or amount of wear of the movable parts of a carburetor, the throttle of the carburetor can be viewed in operation using the camera scope 28 which is moveable by an extension 48 within the throttle body of the carburetor being tested wherein the induction passage can be analyzed. Proper as well as improper fluid flow can be visually inspected. Each carburetor has an induction passage with a predetermined cross-sectional flow area which can be compared to a carburetor that was tested as new. That predetermined area is an area for which, when the carburetor was new, the edge of the throttle was midway along the bypass aperture of the idling circuit. The degree of pressure drawn in the idling circuit of the carburetor is then compared with a reference value which is the degree of pressure which prevails on in a brand-new carburetor operated under the same test fluid and air flow conditions. The device includes a controller having preprogrammed reference values that are checked against the carburetor being tested. This allows used, or new, carburetors to be checked against predetermined reference values. The software providing a comparison of values that are recorded with those prerecorded maintained of each carburetor analyzed under the desired test conditions.

Figure 1:
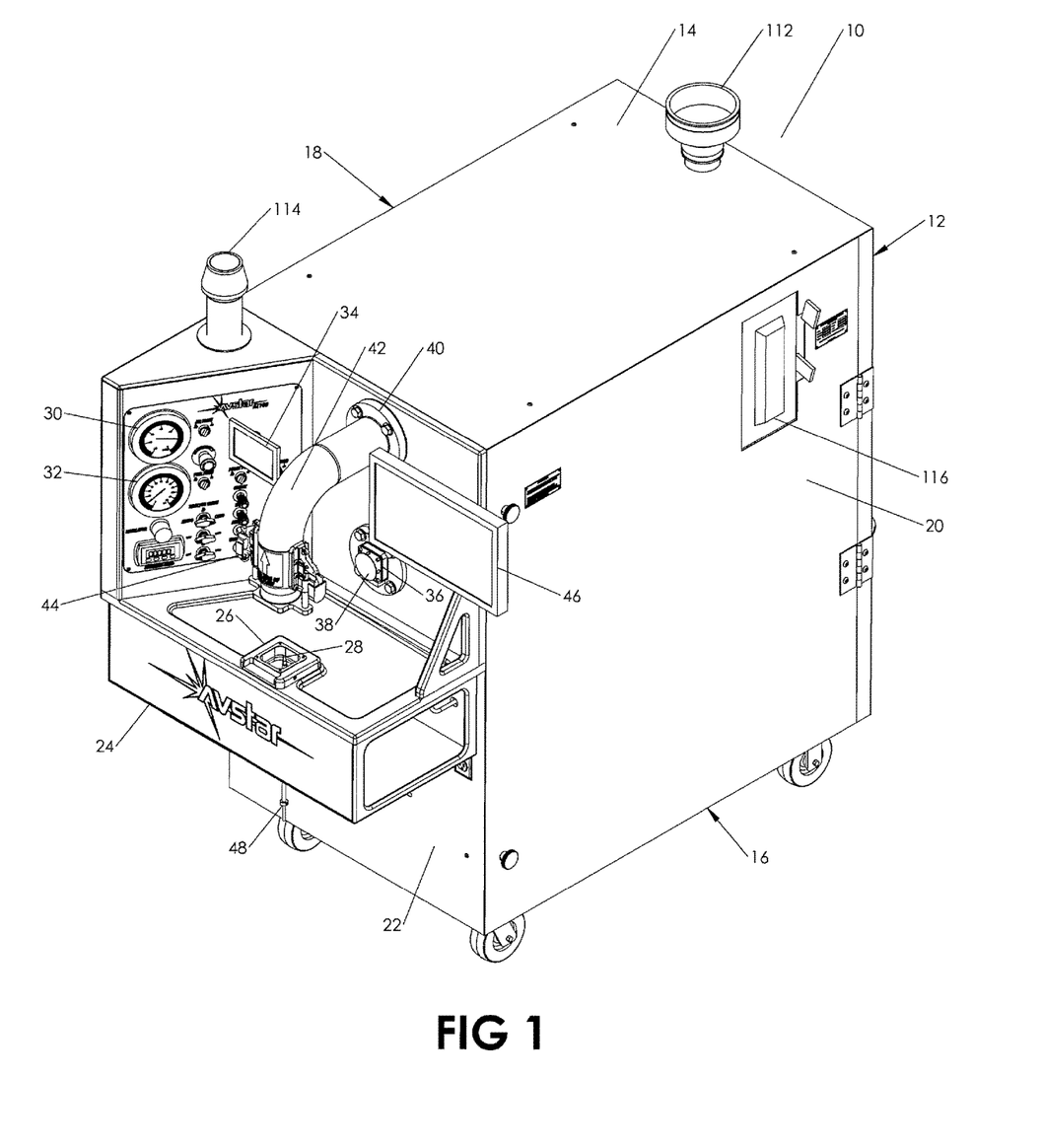
FIG. 1 is a perspective view of the general aviation carburetor testing and analysis device of the instant invention.
Figure 2:
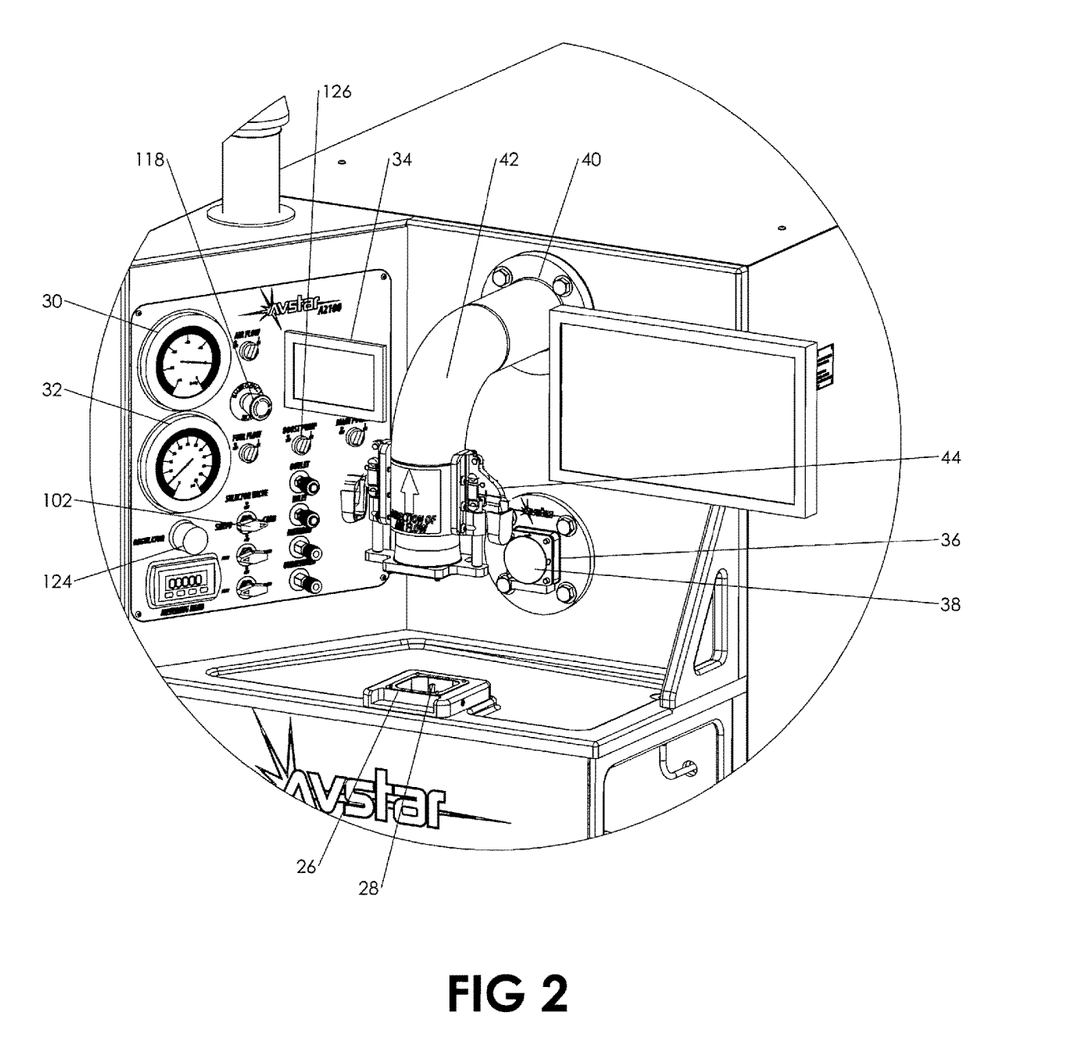
FIG. 2 is an enlarged perspective view of the front panel.
Figure 3:
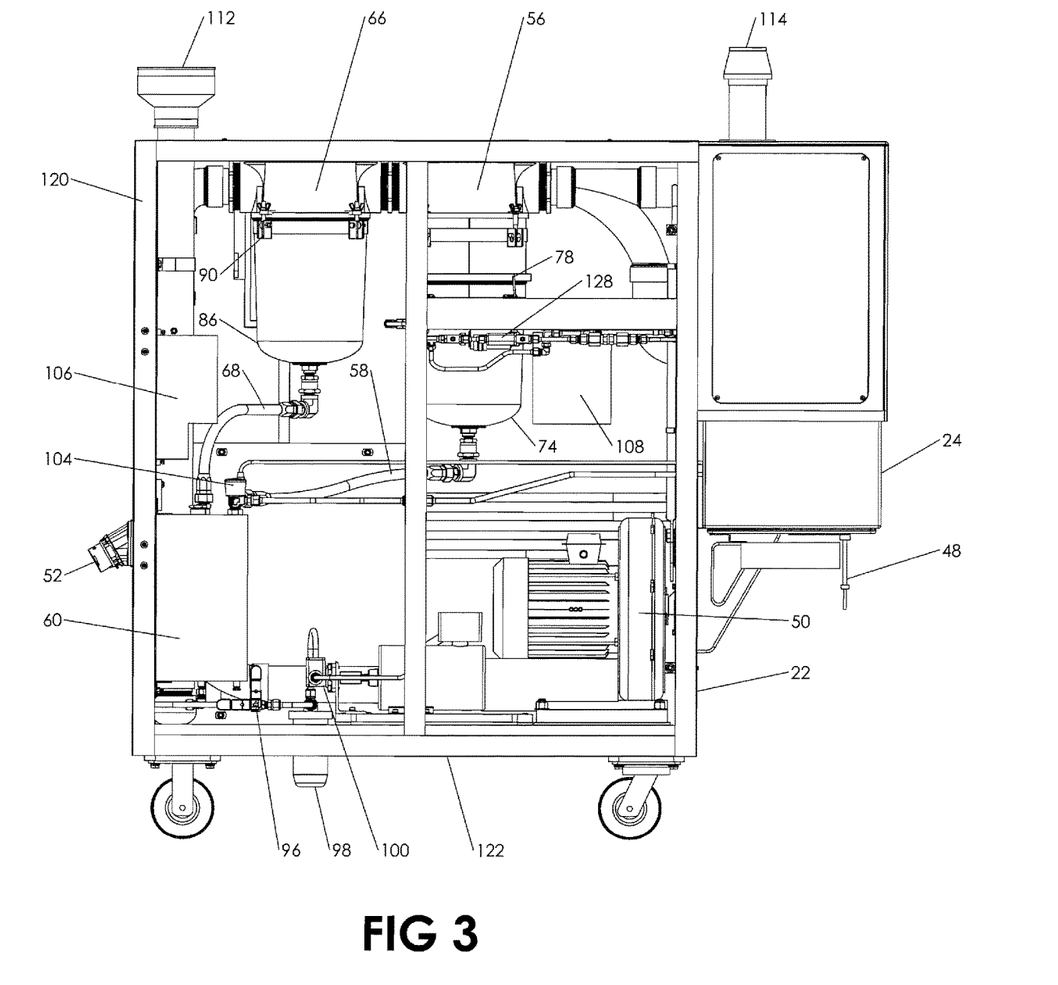
FIG. 3 is side view thereof with the side panel removed.
Figure 4:
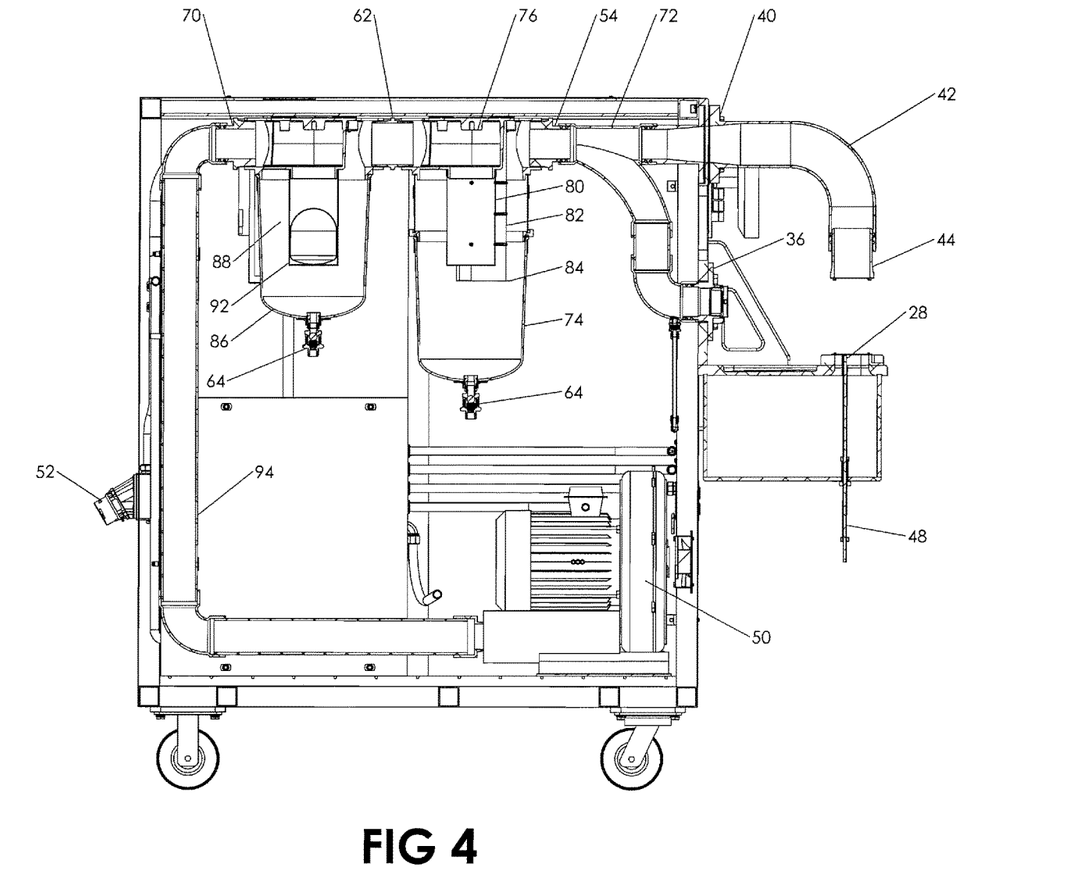
FIG. 4 is a cross sectional side view of FIG. 3 showing the intake air circuit.
Figure 5:
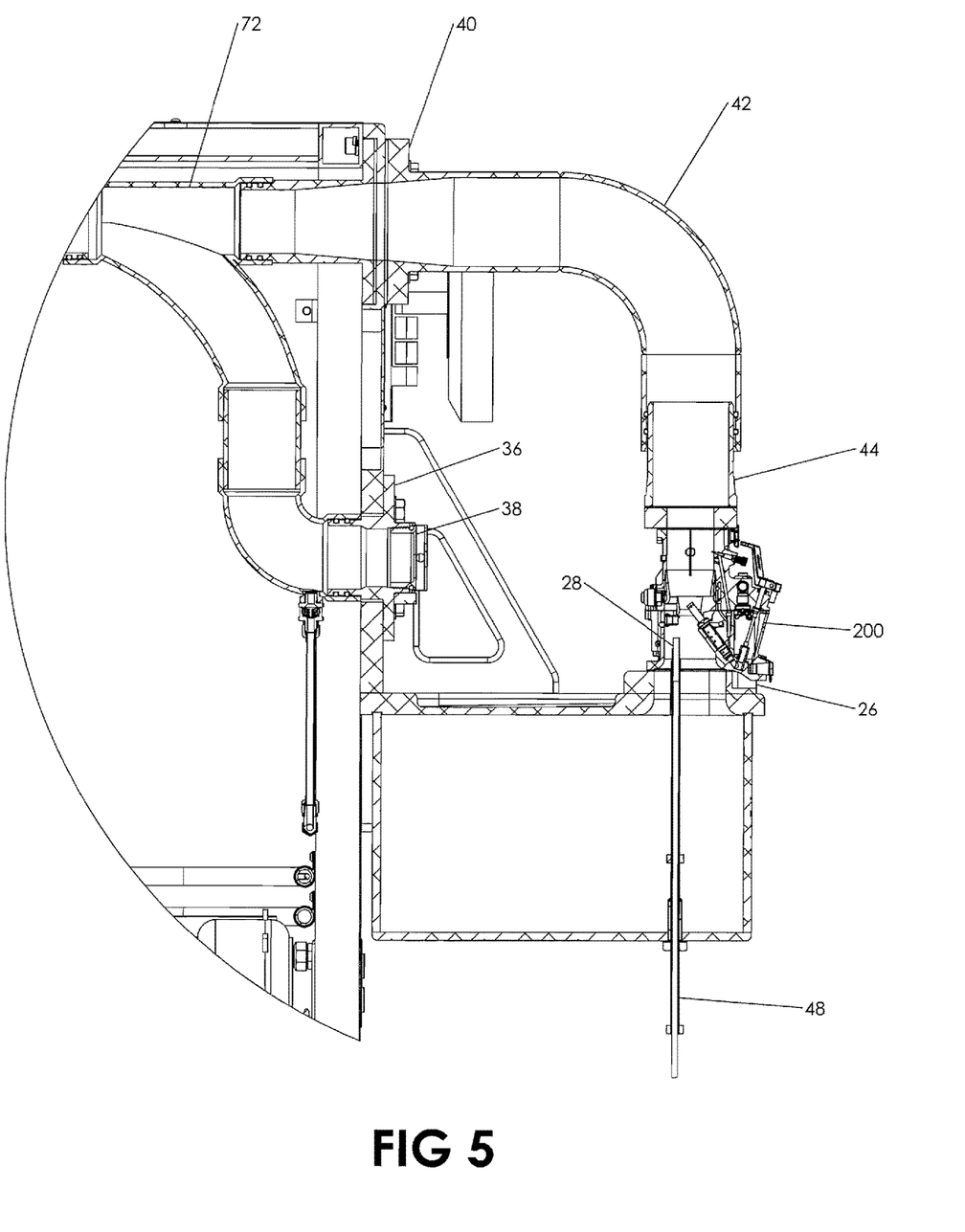
FIG. 5 is a cross sectional view of a carburetor tested in the vertical position.
Figure 6:
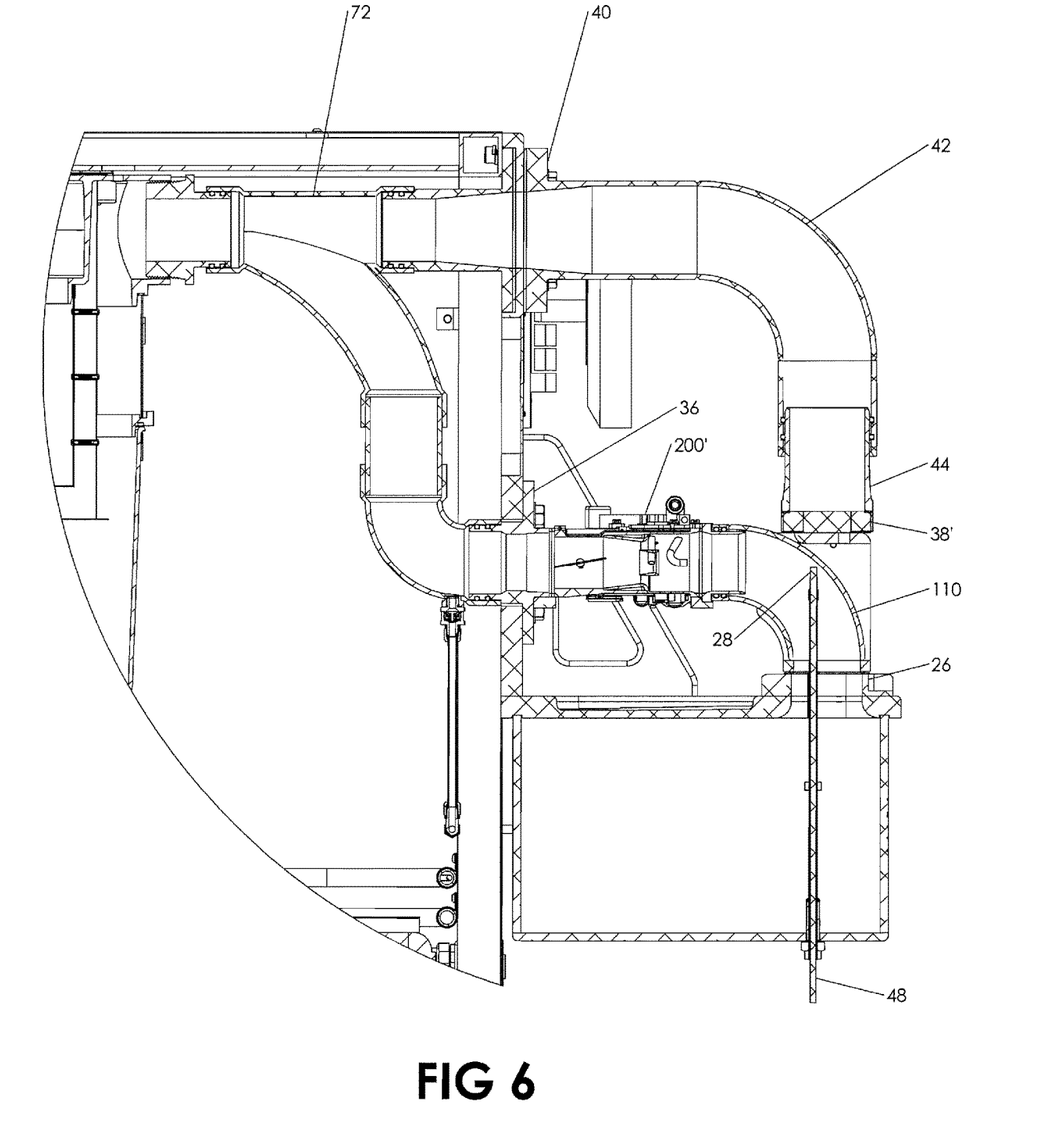
FIG. 6 is a cross sectional view of a carburetor tested in the horizontal position.
Figure 7:
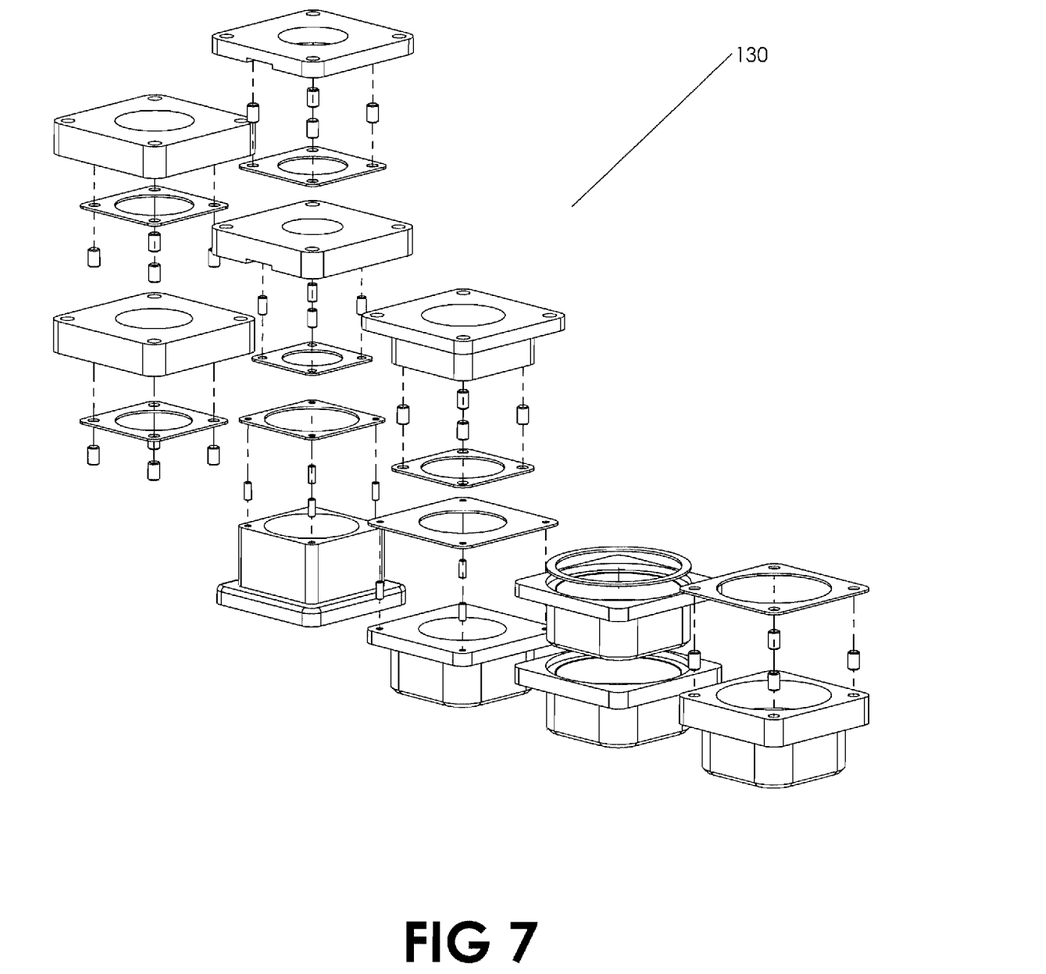
FIG. 7 is an exploded view illustrating the various adapters used for testing fuel systems in the vertical position.

The wye 72 allows airflow from a vertical disposed carburetor 200 by use of a tubing element 42 to position the port 44 directly over the intake plenum 26 as shown in FIG. 5. The vertical adjustment port 44 at the end of the tubing element 42 periscopes to maintain sealing under vacuum for accommodating different height carburetors using various adapters 130 as shown in FIG. 7. When the vertically disposed carburetor 200 is employed, a plug 38 is positioned into the horizontal port to prohibit airflow. Referring to FIG. 6, when a horizontal carburetor 200' is employed, the vertical port 44 includes plug 38' to prohibit airflow through the tubing element 42. An extension tube 110 is used to couple the horizontal carburetor 200' to the intake plenum 26.

The device is vented by use of an external exhaust vent connection 112 that permits the separated air to be expressed outside an enclosed area. A cabinet intake vent 114 includes an air filter and is used to vent the cabinet, the cabinet vent 114 can be drawn from inside an enclosed building. A main shut off panel 116 is positioned on the side panel 20. An emergency shut off switch 118 is placed on the front portion 24.

It will be apparent to those skilled in the art that various changes may be made without departing from the scope of the invention, and the invention is not to be considered limited to what is shown and described in the specification and any drawings/figures included herein. It will be recognized in the industry that that while carburetors and fuel servos in GA aircraft must be maintained to the highest standard, other internal combustion engines would also benefit from the testing and analysis device including air boat, motor vehicles, motorcycles, snowmobiles, and so forth.

One skilled in the art will readily appreciate that the present invention is well adapted to carry out the objectives and obtain the ends and advantages mentioned, as well as those inherent therein. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A portable analyzing device for carburetors and fuel servos used in general aviation comprising:
    a housing supported by wheels;
    an intake plenum secured to said housing, said intake plenum constructed and arranged to receive a carburetor to be analyzed;
    a vacuum pump mounted in said housing, said vacuum pump capable of drawing an airstream through said intake plenum;
    a junction member having a first end fluidly coupled to an outtake of said vacuum pump for receipt of the airstream, said junction member having a first piping element to direct a portion of the airstream to a vertical port extension and a second piping element directing a portion of the airstream to a horizontal port extension;
    a port plug insertable into said horizontal port extension when said vertical port extension is coupled to said carburetor or said port plug insertable into said vertical port extension when said horizontal port extension is coupled to said carburetor;
    a fluid pump coupled to a fluid tank and to said carburetor for transferring a test fluid from said fluid tank to a fluid inlet on said carburetor wherein said carburetor injects test fluid into the airstream;
    a test fluid flow sensor to monitor the amount of fluid drawn from the tank;
    a camera positioned within said intake plenum and insertable into said carburetor, said camera coupled to a display monitor allowing real time viewing of operational aspects of said carburetor;
    a separator for removing test fluid drawn through said carburetor, said separator having returning test fluid to said fluid tank;
    a computer system having a microprocessor and digital storage, said computer system recording operating characteristics of said carburetor and comparing said operating characteristics against predetermined operating characteristics assigned to said carburetor when operated in standard conditions.

2. The portable analyzing device for carburetors according to claim 1 wherein said camera records video or still shots of said carburetor's test fluid drawn through said carburetor.

3. The portable analyzing device for carburetors according to claim 2 wherein said camera is adjustable when said carburetor is positioned on said housing.

4. The portable analyzing device for carburetors according to claim 1 wherein said separator includes a baffle with a drip edge to remove fluid from the airstream.

5. The portable analyzing device for carburetors according to claim 1 wherein said vacuum pump is capable of providing air flows to replicate an engine drawing air at low and high volumes.

6. The portable analyzing device for carburetors according to claim 1 wherein said vacuum pump utilizes an impeller providing an oil free continuous airstream within an anti-sparking cast aluminum housing.

7. The portable analyzing device for carburetors according to claim 1 wherein said vacuum pump provides an airstream to replicate a high rpm of about 2,700 rpm operation or an idle rpm of about 600 rpm.

8. The portable analyzing device for carburetors according to claim 1 wherein said test fluid pump is a general aviation fuel pump.

9. The portable analyzing device for carburetors according to claim 1 including a monitor coupled to said computer system, said monitor displaying said carburetor serial number and test results against a stored test result, and storage of said test results.

10. The portable analyzing device for carburetors according to claim 1 wherein said camera allows for real time inspection of carburetor flow jets while test fluid is passing through said carburetor.

11. The portable analyzing device for carburetors according to claim 1 including a control valve to route said test fluid depending on type of fluid pressure required by said carburetor.

12. The portable analyzing device for carburetors according to claim 1 including an ultrasonic level indicator is used to monitor the amount of test fluid in the fluid tank.

13. The portable analyzing device for carburetors according to claim 1 including a flow transmitter and mass flow meter used to record test fluid flow rate.

14. A process for analyzing carburetors used in general aviation comprising the steps of:
- clamping a carburetor to be analyzed on a portable analysis test bench;
- operating a vacuum pump mounted on said test bench and fluidly coupled to said carburetor, said vacuum capable of creating an airstream through said carburetor;
- pumping test fluid from a storage tank mounted on said test bench into said carburetor;
- visually inspecting test fluid injected into said airstream through said carburetor with a camera positioned in a throttle body of said carburetor, said camera coupled to a display screen for real time visual inspection of operational aspects of said carburetor;
- operating said carburetor at predetermined throttle positions to determine said test fluid flow and comparing said test fluid flow against predetermined flow rates;
- comparing vacuum in said carburetor at predetermined throttle positions to determine carburetor pressure rates and comparing said carburetor pressure rates against predetermined carburetor design rates;
- recording said flow rates to document operating conditions of said carburetor;
- separating test fluid from said airstream using a baffle with a drip edge;
- collecting test fluid separated from said airstream for placement in said storage tank;
- wherein said portable testing device compares the operating condition of said carburetor against predetermined operating characteristics and flow conditions assigned to said carburetor when operated in standard conditions.

\* \* \* \* \*